United States Patent [19]

Guichon

[11] Patent Number: 5,022,029

[45] Date of Patent: Jun. 4, 1991

[54] DATA TRANSMISSION METHOD AND DEVICE

[75] Inventor: Hervé Guichon, Granges les Valence, France

[73] Assignee: Crouzet (Societe Anonyme francaise), Montrouge, France

[21] Appl. No.: 312,007

[22] Filed: Feb. 17, 1989

[30] Foreign Application Priority Data

Feb. 24, 1988 [FR] France ............................ 88 02218

[51] Int. Cl.[5] ........................................ G06F 11/10

[52] U.S. Cl. ............................ 371/38.1; 371/39.1; 371/2.1; 371/69.1

[58] Field of Search .................. 371/38.1, 39.1, 69.1, 371/37.9, 37.2, 37.1, 44, 45, 2.1, 37.8; 340/825.64, 825.65, 825.16; 375/23, 94; 370/8, 9, 10

[56] References Cited

U.S. PATENT DOCUMENTS

| | | | |
|---|---|---|---|
| 4,518,947 | 5/1985 | Poston | 371/69.1 X |
| 4,584,685 | 4/1986 | Gajjar | 371/35 |
| 4,668,950 | 5/1987 | Russell, Jr. et al. | 340/825.65 |
| 4,759,022 | 7/1988 | Akerberg | 371/69.1 X |

FOREIGN PATENT DOCUMENTS

| | | |
|---|---|---|
| 0152341 | 2/1985 | European Pat. Off. . |
| 0235477 | 12/1986 | European Pat. Off. . |
| 3527726 | 5/1987 | Fed. Rep. of Germany . |
| 59-201231 | 4/1983 | Japan . |
| WO85/02924 | 7/1985 | PCT Int'l Appl. . |

OTHER PUBLICATIONS

"Effect of Compound Strategies of Error Correcting Coding, Bit Interleaving, and Diversity Combining in Mobile Radio Data Transmission", Y. Miyagaki, Scripta Technica, Inc., (Jan. 1985), 91-99.

*Primary Examiner*—Jerry Smith
*Assistant Examiner*—Robert W. Beausoliel
*Attorney, Agent, or Firm*—Lowe, Price, LeBlanc, Becker & Shur

[57] ABSTRACT

A method and device are provided for the transmission of data. After organizing the data into words all having the same number of bits, tables are formed each comprising a plurality of words, the words of these tables are coded by means of an error correcting code, and the bits of each table are transmitted using an interleaving method, at a transmission rate sufficient so that, during the time of formation of the table of rank N, a number R of tables, of rank N, N−1, N−2, . . . , N−R are transmitted. The reverse operations are carried out at reception. This method makes it possible to tolerate interruptions in transmission having a relatively long duration, without introducing too great a delay between the source and the user circuit.

6 Claims, 4 Drawing Sheets

DATA TRANSMISSION METHOD AND DEVICE

BACKGROUND OF THE INVENTION

1. Field of the Invention

The present invention relates first and foremost to a method of transmitting data between a source of data to be transmitted, connected to the input of a transmission channel, and a circuit for using the data received from said channel.

Such a method is used, for example, for transmitting data between a buoy detecting underwater targets, such as submarines, and an aircraft, e.g. an airplane, charged with using the measurements made by this buoy.

2. Description of the Prior Art

Such methods are known used in particular for acoustic type buoys, i.e. which detect the acoustic waves transmitted by a target. In this case, the analog signal at the output of the acoustic sensor provided on the buoy modulates the frequency of a carrier, which is transmitted by short wave link to the aircraft. On board the latter, the carrier is demodulated so as to recover the useful signal, which is then transmitted to the user circuit.

Such a method is however not usable for magnetometric type buoys, i.e. which detect the modifications of the Earth's magnetic field related to the presence of a target. In this case, and as is known, the buoy is provided with a very sensitive magnetometer, e.g. of nuclear magnetic resonance type, which measures at regular time intervals the value of the magnetic field in which the buoy is situated. These values are generally available in digital form, each of them being represented by a 24 bit word, for example. The succession of digital words must then be transmitted to the aircraft, where it is processed in the user circuit. When the succession of bits representing the succession of digital words to be transmitted is coded directly, for example, by means of a bi-phase code, and when the carrier is modulated by means of the coded signal, the signal received by the aircraft is not usable, because of the excessive degradation of the data which occurs during passage through the transmission channel, comprising the transmission antenna, the short wave link and the reception antenna. In fact, in the presence of waves, it may happen that the two antennae are no longer in direct sight of each other, for example because the transmission antenna is masked by the waves. Such masking may sometimes last for several seconds, and the result in practice is an interruption, of the same duration, in the transmission between the buoy and the aircraft. This phenomenon, not very troublesome in the case of acoustic type buoys, considering the nature of the data transmitted, may, on the contrary, be very troublesome in the case of magnetometric type buoys. In fact, in the case of a magnetometric type buoy, the processing in the user circuit is carried out on very long signal "time slices". consequently, an error over several consecutive data words disturbs the use of the signal over a much longer period, which could not be tolerated. Calculation shows then that, under nominal connection conditions for which the rate of transmission of the words is usually of the order of about 10 per second, the probability of having a false word must be of the order of $10^{-6}$ to $10^{-7}$.

Moreover, a method for transmitting digital data is known which tolerates interruptions in the transmission, and which is usually designated by interleaving method. Such a method is described for example in the work "Error correction for digital communication" by CLARK-CAIN, Plenum Press. In this method, tables are formed each containing a plurality of words to be transmitted, each of the words to be transmitted is coded by means of an error correcting code, and the tables thus formed and coded are stored temporarily. Then, for transmitting the bits of a table to the input of the transmission channel, the first bit of the first word is transmitted but, instead of continuing with the second bit of the first word, the third bit of the first word and so on, after the first bit of the first word, the first bit of the second word is transmitted, the first bit of the third word, and so on. In this case, when an interruption in the transmission occurs, instead of affecting all the bits of the same word, and even several successive words, it affects for example all the $n^{th}$ bits of several successive words, which is without importance for, because of the error correcting code, the errors in the words received are corrected during decoding.

Such a method thus makes it possible, when it is associated for example with a code capable of detecting and correcting a false bit per word received, to overcome the problems caused by interruptions in the transmission of a duration equal to the product of the duration of a bit transmitted by the number of words in each table. However, this is done at the cost of introducing, between the data source and the user circuit, a delay which can be shown is substantially equal to twice the duration of formation of a table. In fact, before the value of a received word is available, it is necessary to wait until all the words of the table have been received in which it is situated, and obviously a certain time was necessary at transmission for forming this table. For example, when the number of bits per coded word to be transmitted is equal to 16, and when it is desired to be able to tolerate an interruption lasting two seconds, the delay introduced by the interleaving method is about 64 seconds, which is already considerable. In the case of a magnetometric buoy where the words to be transmitted comprise, for coding, a number of useful bits equal to 24, the number of bits per coded word becomes for example equal to 32 and the delay introduced is even greater, which means that the aircraft risks detecting the underwater target when the latter is already too far away.

SUMMARY OF THE INVENTION

The present invention overcomes the above drawbacks by providing a data transmission method capable of tolerating interruptions in the transmission of appreciable duration, without any loss of data, and without introducing too great a delay between the source and the user circuit.

It provides in fact a method of the above defined type, characterized by the fact that :

from the data to be transmitted, words to be transmitted are formed all having the same number of bits, tables are formed each comprising a plurality of words to be transmitted, each of the words of each table is coded by means of an error detecting and correcting code, the bits of each of the tables thus formed and coded are temporarily stored using an interleaving method, the bits of each of the tables thus stored are transmitted to the input of said channel at a rate such that the duration of transmission of all the bits of a stored table is R times smaller than the duration of formation of this stored table, R being a natural integer, and so that, during the duration of formation of the stored table of rank N, N being a natural integer, a number R of stored tables is transmitted, of rank N−1, N−2..., N−R, the bits received at the output of said channel are stored so as to form a succession of received tables, the interleaving of the bits of each of the tables received is undone so as to form received words, each of the received words is decoded so as to detect and correct the errors therein, the whole of the decoded received words of each table received is stored, as well as the total number of errors in this received table, among the tables received of the same rank, the best is chosen, and the decoded received words of this best table are transmitted to the user circuit.

With the method of the invention, without losing data and as will be better understood hereafter, an interruption can be tolerated in the transmission of a duration equal to the product of the duration of formation of a table by a factor substantially equal to (R+1), by introducing a delay equal, on average, to substantially half this duration of formation. Thus, when the duration of formation is about 1 second, interruptions can be tolerated of several seconds, without introducing delays which are too great, as with the interleaving method used alone.

In a first embodiment of the method of the invention, the table whose total number of errors is the smallest is chosen as the best table.

Thus, it is practically certain that a set of words received is transmitted to the user circuit under good conditions, and so having few errors after decoding, considering the very low probability that at least one table received under good conditions is not present among the tables received of the same rank.

In a second embodiment of the method of the invention, the first table received whose total number of errors is less than a threshold is chosen as the best table.

Thus, the delay introduced is minimized since, as soon as a table of sufficient quality is received, it is transmitted to the user circuit.

The present invention also relates to a device for implementing the above method.

BRIEF DESCRIPTION OF THE DRAWINGS

The present invention will be better understood from the following description of a preferred embodiment of the method of the invention and the preferred embodiment of the device of the invention, with reference to the accompanying drawings in which.

DESCRIPTION OF THE PREFERRED EMBODIMENTS

Figure 1:
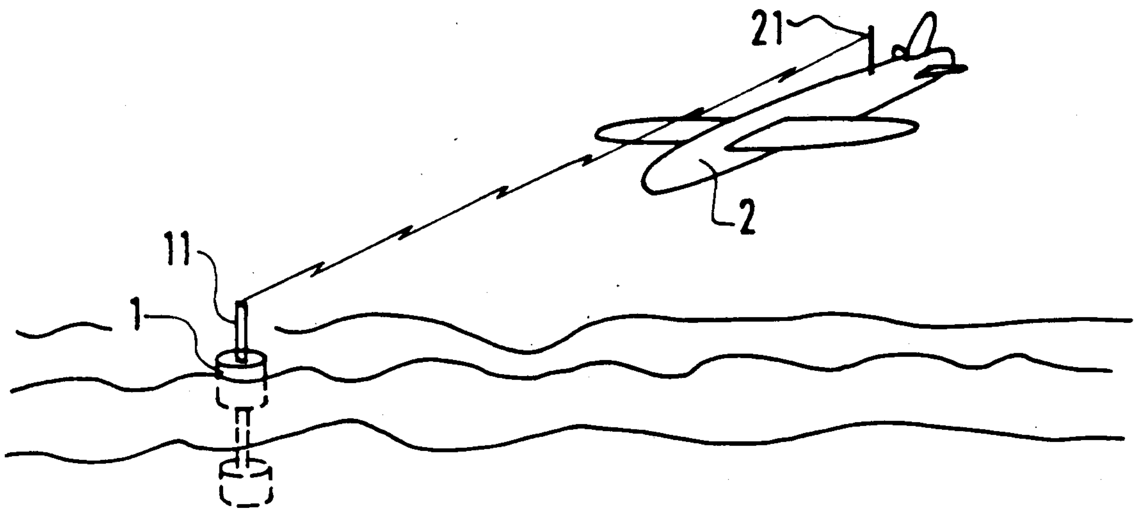
FIG. 1 shows schematically an underwater target detection buoy transmitting data to an observation aircraft.

Referring to FIG. 1, a buoy 1, for detecting underwater targets such as submarines, measures at regular intervals the modulus of the magnetic field in which it is situated and transmits these measurements by short wave link to an aircraft, here an airplane 2. For this, the buoy has a transmission antenna 11 and the aircraft a receiving antenna 21. On board the aircraft 2 circuits are provided for receiving, processing and using these measurements, so as to detect a target from disturbances of the magnetic field which are created by it.

In bad weather, interruptions or fading occurs in the transmission between the antennae 11 and 21, due mainly to masking of antenna 11 by the waves, to slanting thereof or else immersion thereof. The transmission method which will now be described makes it possible to tolerate such interruptions without losing useful data and without introducing a shift or delay time which is too great, between the moment when the target to be detected is in the vicinity of buoy 1 and the moment when it is effectively detected by aircraft 2.

Figure 2:
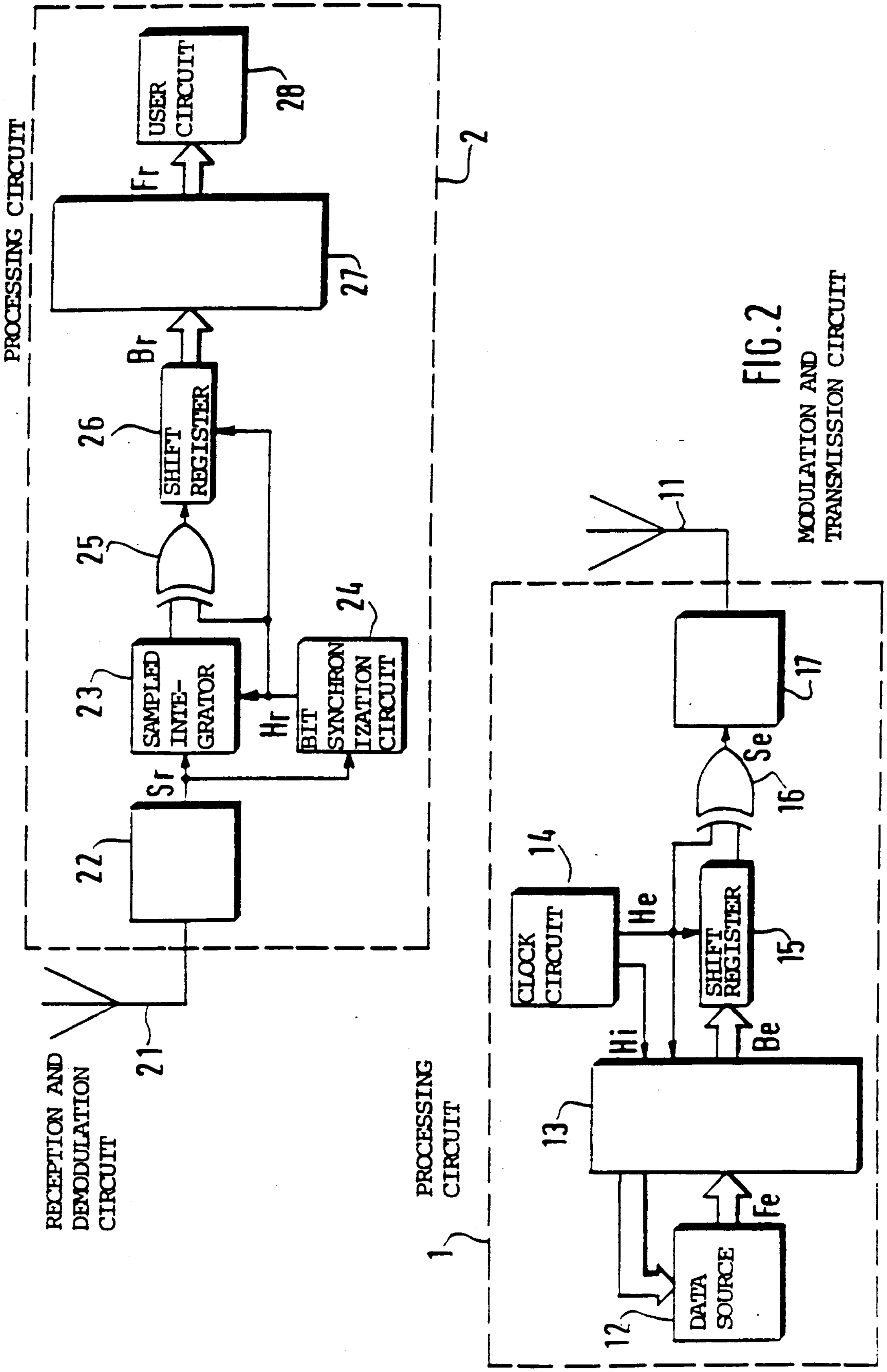
FIG. 2 is a block diagram of the circuits providing the link between the buoy and the aircraft of FIG. 1.

Referring now to FIG. 2, buoy 1 comprises more particularly a data source 12, a processing circuit 13, a clock circuit 14, a shift register 15, an exclusive OR circuit 16 and a modulation and transmission circuit 17.

The data source is here a nuclear magnetic resonance magnetometer which delivers a digital signal $F_e$ to the processing circuit 13. The digital signal $F_e$ here comprises a succession of words each having 24 useful bits, each word representing a sample, at a given time, of the modulus of the magnetic field measured by the magnetometer 12. The magnetometer 12 has a control input receiving a digital signal from the processing circuit 13, for controlling its measuring rate.

The processing circuit 13 is here a microprocessor which delivers a digital signal $B_e$ to the parallel input of the shift register 15. It receives an internal clock signal $H_i$ and a transmission clock signal $H_e$ coming from the clock circuit 14.

The shift register 15 receives, at its clock input, the signal $H_e$ and its series output is connected to a first input of the exclusive OR circuit 16 which receives the signal $H_e$ on its second input.

The exclusive OR circuit 16 delivers a signal $S_e$, here of bi-phase type, to the input of the modulation and transmission circuit 17. The modulation and transmission circuit 17 comprises all the circuits required for generating the carrier, for modulating this carrier by means of signal $S_e$ and transmitting the carrier thus modulated by applying it to the transmission antenna 11. Such a circuit is obviously within the scope of a man skilled in the art, and it will not be further described here.

On board aircraft 2 there is provided, connected to the receiving antenna 21, an assembly comprising a reception and demodulation circuit 22, a sampled integrator 23, a bit synchronization circuit 24, and exclusive OR circuit 25, a shift register 26, a processing circuit 27, and a user circuit 28.

The reception and demodulation circuit 22 is connected directly to antenna 21, and it comprises all the circuits required for receiving the modulated carrier from the buoy 1 and demodulating it. Such a circuit is obviously within the scope of a man skilled in the art and will not be described further here. It delivers a signal $S_r$, here of bi-phase type, to the sampled integrator 23 and to the bit synchronization circuit 24.

The bit synchronization circuit 24, of known type, delivers a clock signal $H_r$ to the sampled integrator 23 and to the first input of the exclusive OR circuit 25.

The output of the exclusive OR circuit 25 is connected to the input of the shift register 26.

The shift register 26 receives, at its clock input, the signal $H_r$ and its parallel output delivers a signal $B_r$ to the processing circuit 27.

The processing circuit 27 is here a computer carried on board the aircraft 2 and it delivers a digital signal $F_r$ to the user circuit 28.

The assembly which has just been described operates as follows, with reference particularly to FIGS. 3 to 6.

The processing circuit 13 is adapted for controlling the magnetometer 12 so that ten measurements of the magnetic field are made every second. The digital signal $F_e$ comprises then ten words, of 24 bits each, per second, each of these words being therefore transmitted to aircraft 2.

Figure 3:
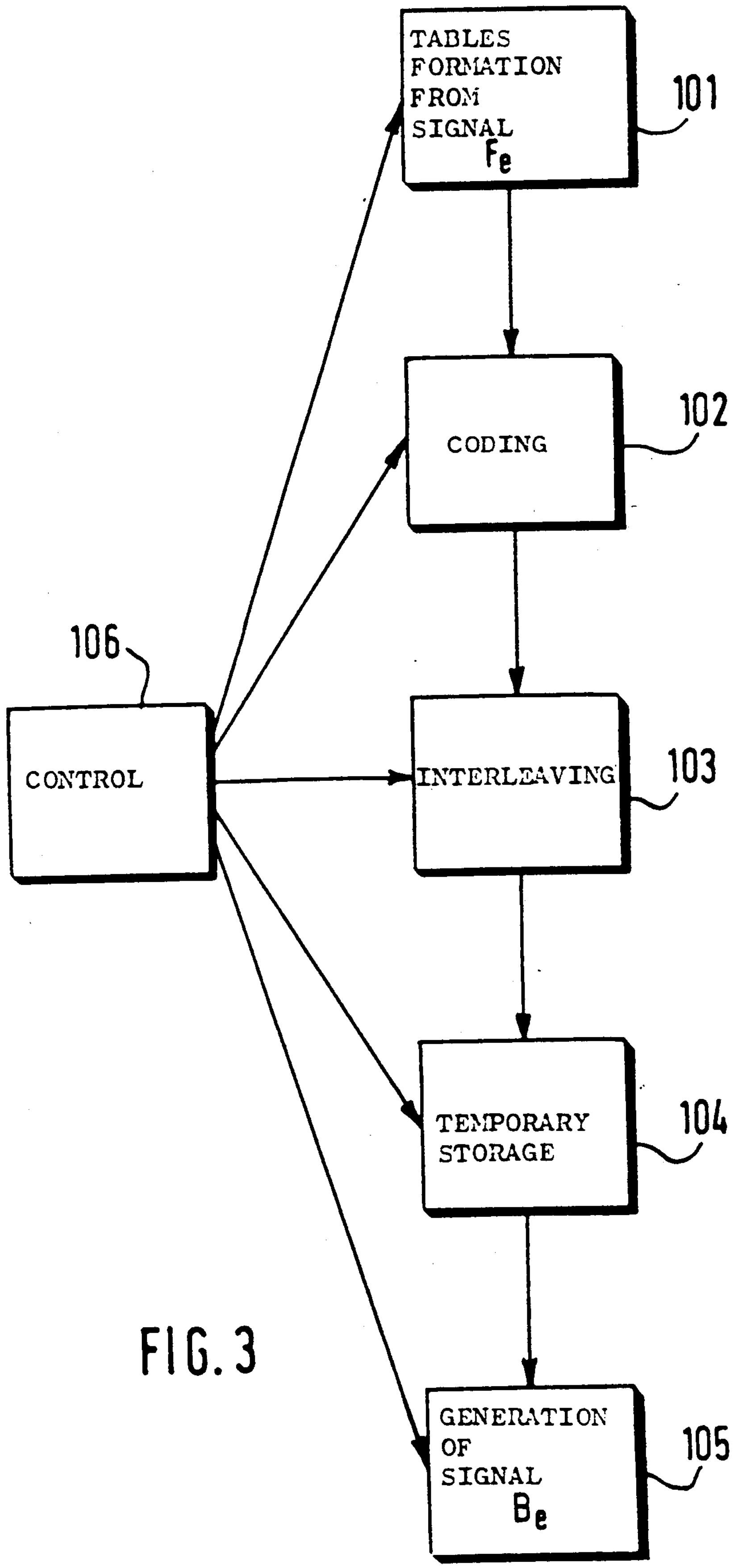
FIG. 3 is a flowchart of the operation of the processing circuit, on the transmission side, of FIG. 2.

As block 101 of FIG. 3 shows, the processing circuit 13 begins by forming tables, each comprising a plurality of words to be transmitted. Here, each table comprises ten words to be transmitted. During processing on board aircraft 2 particularly, so that each of the tables may be identified, the processing circuit 13 adds an identification word to the ten useful words of each table, which states in particular the order number or the rank of the table. In this case, and for obvious reasons of convenience, the identification word comprises the same number of bits as the useful words, i.e. 24.

Then, and as shown by block 102 in FIG. 3, the processing circuit 13 codes each of the words of each table by means of an error detecting and correcting code, here the known type of Hamming code (32, 26 ), which makes it possible to code a word of 26 useful data bits into a coded word of 32 bits. In such coding, and as is known, six control bits, one of which is an overall parity bit, are introduced for detecting and correcting certain transmission errors during decoding of the words received after transmission.

Thus, when all the control bits, including the overall parity bit, of a received coded word of 32 bits are zero, it is considered that the useful word of 26 bits has been transmitted without error and it is kept as it is.

When the overall parity bit is non zero, and when the other control bits are not all zero, it is considered that the useful word is affected by a single error, i.e. one and only one of its bits has been badly transmitted, the position of which bit is indicated by the control bits. This badly transmitted bit can then be corrected so as to restore the useful word of 26 bits without error.

When the overall parity bit is zero, but when the other control bits are not all zero, it is considered that the useful word is affected by a double error, i.e. that two and only two of its bits have been badly transmitted. Since the control bits do not indicate the positions of these bits, the detection of such a double error cannot be followed by its correction, but its presence may be stored in memory.

When the overall parity bit is non zero, and when all the other control bits are zero, it is possible that the useful word is affected by a triple error, e.g. the most probable case is that the overall parity bit itself has been badly transmitted. It is then considered that the useful word of 26 bits has been correctly transmitted and it is kept as it is, while however memorizing the fact that there is a non zero probability that it is affected by a triple error.

Here, since the words to be coded comprise 24 bits each, they are completed by two arbitrary bits, or carriers of other data to be transmitted. Hamming's code (32, 26) is then suitable and, in addition, it is a relatively simple code to use.

Figure 4:
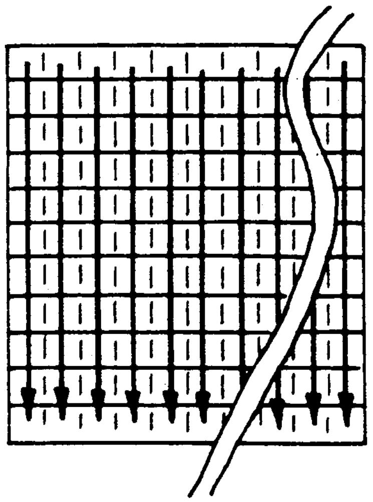
FIG. 4 is a diagram for explaining the interleaving method used in the processing circuit of FIG. 3.

As shown by blocks 103 and 104 of FIG. 3, the processing circuit 13 then interleaves the bits of each table, formed and coded as has been explained, and stores them temporarily. In this Case, the interleaving is single interleaving as shown in FIG. 4. In this figure a table has been shown comprising an identification word and ten useful bits. Each word is written horizontally from left to right, each box symbolizing a bit. The identification word is shown at the top of the table, the first useful word immediately below then the second useful word and so on. The arrows represent the order of storing the bits of the table. It will then be noted that the bits are stored in the following order.

first bit of the identification word,
first bit of the first useful word,
first bit of the second useful word,
first bit of the third useful word,
...
first bit of the tenth useful word,
second bit of the identification word,
second bit of the first useful word,
second bit of the second useful word,
....

and so on, as far as the thirty-second bit of the tenth useful word.

Figure 5:
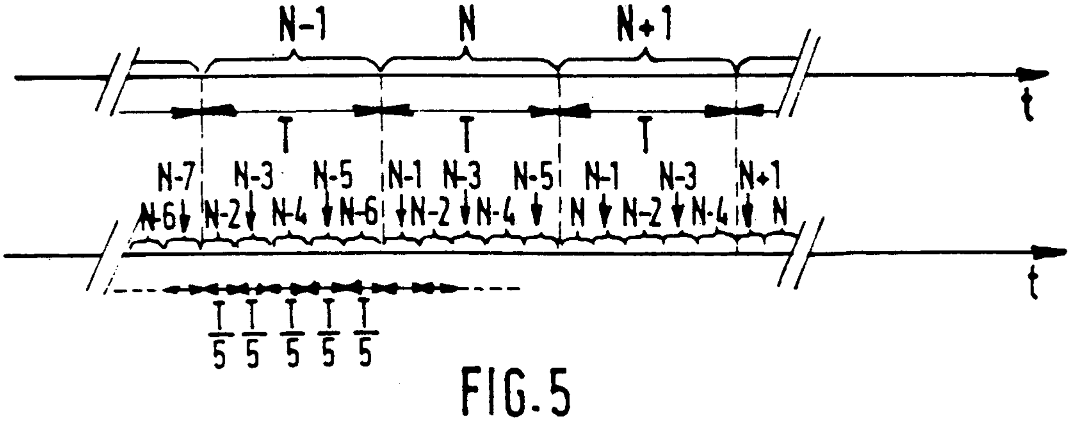
FIG. 5 is a timing diagram illustrating the operation of the processing circuit of FIG. 3.

Then, and as shown by block 105 in FIG. 3, the processing circuit 13 generates the signal $B_e$ which is applied to the shift register 15, i.e. transmitted to the input of the transmission channel between the buoy and the aircraft 2. As shown in FIG. 5, the bits of signal $B_e$ are the bits of each of the stored tables, but these bits are transmitted at a rate such that the duration of transmission of all the bits of a stored table is R times smaller than the duration of formation of this table. Here, the natural integer R is chosen equal to 5.

In FIG. 5, the upper diagram shows the equal durations T of formation of the stored tables of rank $N-1$, N and $N+1$ and their evolving, whereas the lower diagram shows the durations of transmission of these tables, here equal to T/5 and the evolving of these transmissions. Since the duration for transmission of a table is 5 times smaller than its duration of formation, it is possible to transmit 5 tables during the formation of a single one. Thus, the 5 stored tables of rank N-1, N-2, N-3, N-4 and N-5 are transmitted during the duration of formation of the stored table of rank N. Each stored table is then in fact transmitted five times. In a way not shown, because it is known, the processing circuit 13 inserts a synchronization word in the signal $B_e$, before each transmitted table. In addition, it inserts a repetition index for each transmitted table, which indicates that it is a question of the first, second, third, fourth or fifth transmission of a table of given rank.

The processing circuit 13 is further adapted, in an obvious way for a man skilled in the art, for controlling the different tasks of blocks 101 to 105, as is shown by block 106 in FIG. 3.

In a way known per se, the parallel digital signal $B_e$ outputted by the processing circuit 13 is transformed into a bi-phase signal $S_e$ after passing through the shift register 15 and the exclusive OR circuit 16, before being applied to the modulation and transmission circuit 17 which supplies the transmission antenna 11.

The corresponding signal received by antenna 21 is applied to the input of the reception and demodulation circuit 22 which outputs the bi-phase signal $S_r$.

In a way known per se, the sampled integrator 23, the bit synchronization circuit 24, the exclusive OR circuit 25 and the shift register 26 transform the bi-phase signal $S_r$ into a parallel digital signal $B_r$ applied to the processing circuit 27.

Figure 6:
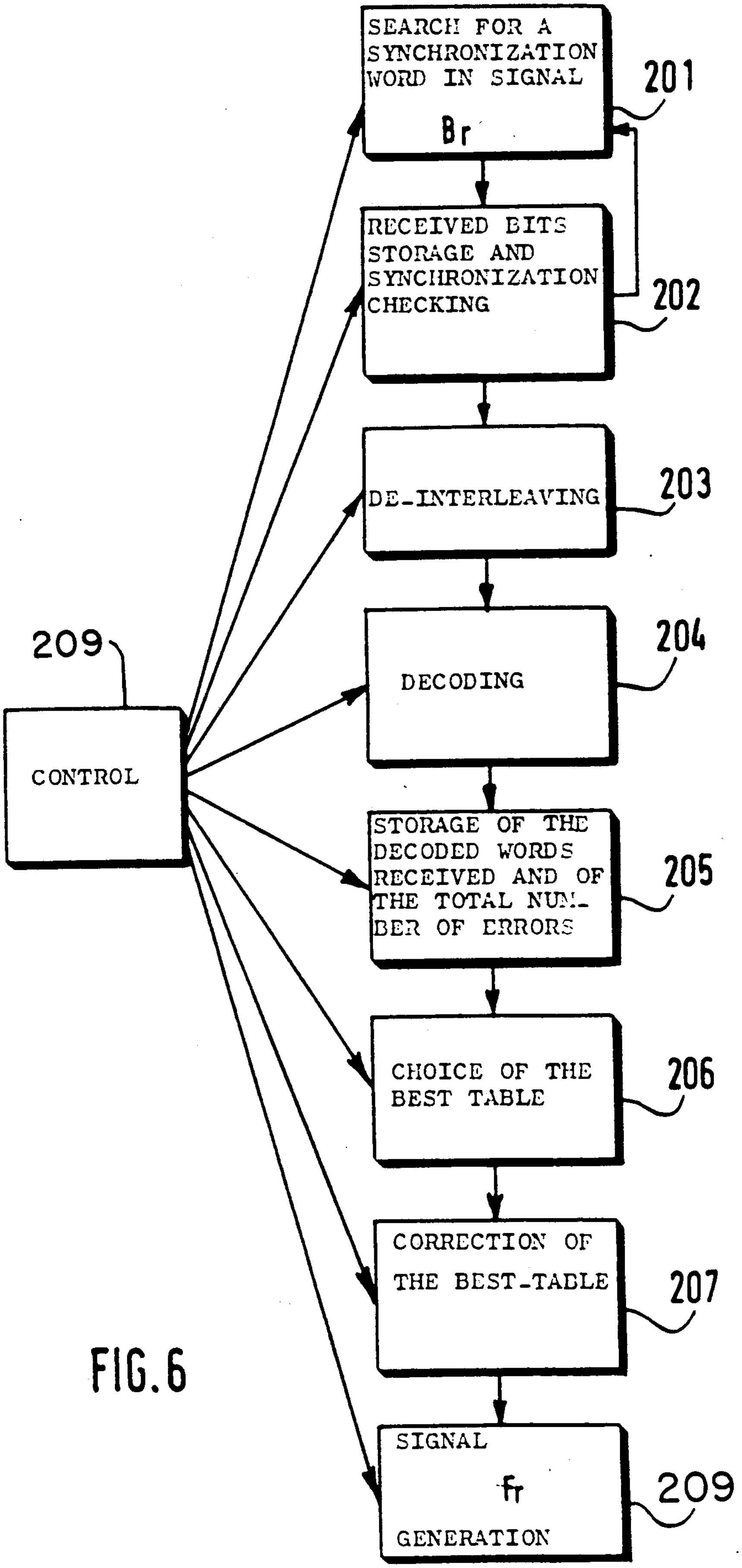
FIG. 6 is a flowchart of the operation of the processing circuit, on the reception side, of FIG. 2.

As shown by block 201 in FIG. 6, during an initialization procedure, the processing circuit 27 searches first of all for a synchronization word in the signal $B_r$, e.g. by comparing at each instant the bits present in the reception register, not shown, with which it is provided, with the configuration of bits in the synchronization word which it has chosen.

When a synchronization word is recognized, as shown by block 202 in FIG. 6, the processing circuit 27 stores the bits received, so as to form a succession of received tables corresponding to the succession of transmitted tables. Simultaneously, the processing circuit 27 continues to check that the synchronization words are indeed received at the right time. In fact, when the synchronization is lost, it is generally because an interruption has occurred in the link and it is then necessary to search for a new synchronization word.

Then, as shown by block 203 in FIG. 6, the processing circuit 27 "de-interleaves" or more exactly undoes the interleaving of the bits of each of the tables so as to form received words, here each having 32 bits, and corresponding to coded words of the coded tables discussed in connection with the operations carried on board buoy 1. We may say that, during this step, the processing circuit 27 carries out the reverse operation of that shown schematically in FIG. 4.

The processing circuit 27 may then proceed, as shown by block 204 in FIG. 6, to decoding the words received to detect and correct the error therein. As is well known and as has already been partially explained, the decoding of each word received of 32 bits results in a decoded word received of 26 bits, brought down to 24 in the particular case described here.

As shown by block 205, the processing circuit 27 then stores all the decoded words received of each table received and the total number of errors in this received table. For this, and in the particular example taken here, the processing circuit 27 assigns a weighting coefficient to each decoded word received, related to the type of error detected during decoding, because of the use of the Hamming code (32, 26). Thus, a coefficient of value 0 is assigned to a word having no error, a coefficient of value 1 is assigned to a word comprising a single error, this single error being then corrected, and a coefficient of value 2 is assigned to a word comprising a double error. The total number of errors in a table received is then calculated by summing the coefficients assigned to each of the words of this table received, then it is stored.

The processing circuit 27, during the step shown schematically by block 206, chooses among the tables received of the same rank, the best table, i.e. the one whose total number of errors is the smallest. If no interruption of transmission has occurred recently, there is a number R, here equal to 5, of received tables available of a given rank. The processing circuit 27 then determines, among these 5 tables, the one whose total number of errors is the smallest. This table will be called hereafter reference table. The processing circuit 27 also determines the table received whose total number of errors is the closest to the number of errors of the reference table. This table will be called emergency table. If an interruption of transmission has occurred recently, it may be that there are less than R tables received available of a given rank. However, it is always arranged in practice for there to be at least one received table of a given rank, by determining, as will be better understood hereafter, the number R as well as the number of words per table so that such is the case once the maximum possible duration of an interruption has been defined.

As shown by block 207 in FIG. 6, the processing circuit 27 then corrects, in the reference table, the words comprising errors, by means of corresponding words from the emergency table. For this, it first of all compares the corresponding words bit by bit, i.e. having the same position, in the reference table and in the emergency table. When it finds a word in the emergency table different from its corresponding one in the reference table, it searches to see if errors have been detected in this word of the reference table. If no error has been detected in this word, the latter is maintained. If at least one error has been detected in this word, the number of errors of the corresponding word in the emergency table is sought for and, if a lower number of errors has been detected for this word from the emergency table, the reference table is corrected by replacing the initial word of the reference table by the better word from the emergency table.

Finally, the processing circuit 27 generates the signal $F_r$ from received decoded words of the reference table, corrected as has just been explained so that these words are transmitted, for using the measurements, to the user circuit 28.

The processing circuit 27 is further adapted, in a way obvious to a man skilled in the art, for controlling the different tasks of blocks 201 to 208, as is shown by block 209 in FIG. 6.

It may be readily shown that, when the method of the invention is used, the maximum duration $D_{Max}$ of the interruption of transmission which is tolerable is equal to :

$$D_{Max}=T\times(R-1)(R+2)/R$$

This expression is established by considering that an interruption may occur between the first transmission of the table of rank N−1 and the last transmission of the table of rank N, without that resulting in a loss of data since, in the extreme case, an example of the table of rank N−1 and an example of the table of rank N are still received. In the example presently described, an interruption $D_{Max}$ approximately equal to 6 seconds may be tolerated, since the number R is equal to 5, and since the duration T of a table is slightly greater than a second, considering the presence of the identification word. It will be noted that, when R becomes great, the above expression approximates the value $T\times(R+1)$.

In the practice of the method which has just been described, the delay introduced by the different processing operations is about 5 seconds, for five examples of a table of given rank are received before choosing the best, which takes approximately a time equal to five times the duration T, as shown in FIG. 5. In the application considered, such a delay is quite tolerable.

Nevertheless, when a particularly short delay is desired, it is possible to modify the method of the invention so as to further reduce this delay. For this, a threshold is defined for the total number of errors, which is chosen fairly low so that a received table having a total number of errors less than the threshold can be considered of acceptable quality, and as best table of a given rank the first table received of this rank is chosen which satisfies this condition. It can then be shown that the delay introduced is on average (T/5) in the absence of interruption, and (T/2+T/5) in the presence of an interruption, to which delay must then be added the duration of the interruption, of course.

It will be further noted that the use of Hamming's code and of the interleaving method makes it possible to overcome, at least partially, the reduction of the signal to noise ratio on reception which accompanies the reduction of the duration of the transmitted bits, which reduction is provided in the method of the invention so as to allow repetition of the transmitted tables. The use of Hamming's code guarantees the probability of error per word which is desired, of about $10^{-7,}$ from the moment when the probability of error per bit, during transmission, is about $10^{-4}$ to $10^{-5}$ which is the case here.

Naturally, the present invention is not limited to the description which has just been given.

Thus, for the sake of simplicity, it has been considered that only the useful data to be transmitted were the values measured of the magnetic field. In practice, a certain number of data, fixed or with analog variations, must also be transmitted from the buoy 1 to aircraft 2. It is obviously within the scope of a man skilled in the art to convert this data into digital data and then to form, from this data, words to be transmitted all having the same number of bits.

Similarly, it is not obligatory to use the simple interleaving method which has been described, and a synchronous interleaving method may be used or else a random interleaving method, such as they are described for example in the cited work.

Similarly, another error detecting and correcting code could be chosen and the method for determining the total number of errors in each table received may be adapted accordingly. Even when using Hamming's code (32, 26), it is not obligatory to use the above values of the weighting coefficients, which were given solely by way of examples.

Similarly, it is not obligatory to correct the reference table with the emergency table, and the reference table may also be used as it is without correction, or else be corrected by means of words from other tables received of the same rank.

Finally, the different tasks carried out by the processing circuits 13 and 27, which are here a microprocessor of the type 8031 of the firm INTEL and a micro computer 68000 of the firm MOTOROLA could also be each carried out by a specialized circuit, e.g. a synchronization word search circuit, a "de-interleaving" circuit, a decoding circuit specialized for the Hamming code, and so on.

What is claimed is:

1. A method of transmitting data between a source of data to be transmitted, connected via a transmission channel, and a user circuit for using the data received via the transmission channel, comprising the steps of:

- forming words, all having the same number of bits from the data to be transmitted;
- forming tables, each comprising a plurality of words to be transmitted; encoding each of the words of each of the tables in accordance with an error detecting and correcting code;
- interleaving and temporarily storing the bits from each of the tables;
- transmitting the bits of each of the stored tables having ranks of N−1, N−2 ..., N−R, via the transmission channel within a time period required for the formation of a stored table having a rank of N, N being a natural integer;
- storing the bits received via said transmission channel to form a succession of receiving tables;
- de-interleaving the bits of each of the receiving tables to form received words;
- decoding each of the received words to detect and correct errors therein;
- storing the decoded received words of each receiving table and an indication of total errors in each receiving table;
- choosing a receiving table designated as best table from among receiving tables having the same rank; and
- transmitting the words of the best table to the user circuit.

2. The method as claimed in claim 7, wherein the table whose total number of errors is the smallest is chosen as the best table.

3. The method as claimed in claim 7, wherein the first table received whose total number of errors is less than a threshold is chosen as the best table.

4. The method as claimed in claim 7, wherein, in said best table, the words are corrected comprising errors, by means of corresponding words from other tables received of the same rank.

5. The method as claimed in claim 7, wherein:

- a code is used capable of detecting, in a word received, a single error and a double error,
- to each received and decoded word a coefficient is assigned related to the type of error detected during decoding thereof, and
- the total number of errors of a received table is stored by storing the sum of the coefficients of the received and decoded words of this received table.

6. A device for transmitting date between a source of data to be transmitted, connected to the input of a transmission channel, and a user circuit using the data received from said channel, comprising :

- means for forming, from the data to be transmitted, words to be transmitted all having the same number of bits,
- means for forming tables each comprising a plurality of words to be transmitted,
- means for coding each of the words of each table by means of an error detecting and correcting code,
- means for temporarily storing the bits of each of the tables thus formed and coded using an interleaving method,
- means for transmitting the bits of each of the tables thus stored to the input of said channel at a rate such that the duration of transmission of all the bits of a stored table is R times smaller than the duration of formation of this stored table, R being a natural integer, and so that, during the duration of formation of the stored table of rank N, N being a natural integer, a number R of stored tables is transmitted, of rank N−1, N−2..., N−R,
- means for storing the bits received at the output of said channel so as to form a succession of received tables,
- means for undoing the interleaving of the bits of each of the tables received and forming received words, means for decoding each of the received words and detecting and correcting the errors therein, means for storing the whole of the received and decoded words of each table received, as well as the total number of errors in this received table, means for choosing, among the tables received of the same rank, the best one, and means for transmitting the received and decoded words of this best table to the user circuit.

* * * * *